United States Patent Office 3,038,930
Patented June 12, 1962

3,038,930
1,2,3,4,4a,9,10,10a - OCTAHYDRO - 7 - HYDROXY-6-METHOXY-1,4a - DIMETHYL - PHENANTHRENE-1-(CARBOXYLIC ACID/METHANOL) AND CORRESPONDING ESTERS
Roy H. Bible, Jr., Morton Grove, Ill., assignor to G. D. Searle & Co., Chicago, Ill., a corporation of Delaware
No Drawing. Filed Aug. 12, 1960, Ser. No. 49,170
6 Claims. (Cl. 260—488)

This invention relates to 1,2,3,4,4a,9,10,10a-octahydro-1,4a-dimethyl-6,7-dioxyphenanthrene-1-(carboxylic acid/methanol), corresponding esters, and processes for the manufacture thereof. More particularly, this invention relates to chemical compounds of the formula

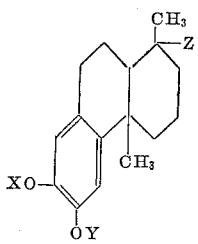

wherein X represents hydrogen or an alkanoyl radical; Y represents hydrogen or an alkyl radical; and Z represents a carboxy, alkoxycarbonyl, hydroxymethyl, or alkanoyloxymethyl radical.

Among the alkyl radicals represented by Y, especially lower alkyl radicals are preferred, which is to say methyl, ethyl, propyl, butyl, isobutyl, sec-butyl, tert-butyl, pentyl, isopentyl, tert-pentyl, neopentyl, hexyl, isohexyl, heptyl, octyl, and the like $C_nH_{2n+1}$ groupings wherein $n$ is a positive integer amounting to less than 9.

The alkanoyl radicals represented by X and the alkoxycarbonyl and alkanoyloxymethyl radicals represented by Z likewise are optimally of lower order, whence those skilled in the art will understand groupings of the formulas

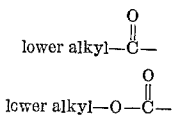

and

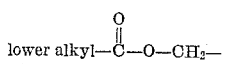

respectively.

The compounds to which this invention relates are useful by reason of their valuable pharmacological properties. In particular, they are diuretics adapted to block the effect of desoxycorticosterone acetate on urinary sodium and potassium.

Manufacture of the subject compounds proceeds from corresponding 7-alkanoyl compounds of the formula

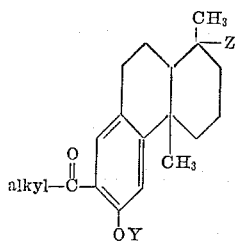

wherein Y and Z have the meanings assigned above, which, upon contacting in benzene solution with perbenzoic acid, afford the 7-esters hereof. These, in turn, upon heating with methanolic hydrochloric acid yield the 7-phenolic products of the invention.

The following examples describe in detail compounds illustrative of the present invention and methods which have been devised for their manufacture. However, the invention is not to be construed as limited thereby, either in spirit or in scope, since it will be apparent to those skilled in the art of organic synthesis that many modifications, both of materials and of methods, may be practiced without departing from the purpose and intent of this disclosure. Throughout the examples hereinafter set forth, temperatures are given in degrees centigrade and relative amounts of materials in parts by weight, except as otherwise noted. Specific rotations refer to the D line of sodium.

Example 1

A. *1,2,3,4,4a,9,10,10a - octahydro - 6 - methoxy - 1,4a-dimethyl - 7 - propionyl - 1 - propionyloxymethylphenanthrene.*—To a solution of 100 parts of 1,2,3,4,4a,9,10,10a-octahydro-6-methoxy - 1,4a - dimethylphenanthrene-1-methanol (0-methylpodocarpinol) in 444 parts of chlorobenzene is added, with agitation during 10 minutes, 32 parts of propionyl chloride. After 15 minutes further agitation, the resultant mixture is chilled to temperatures in the range 10–15° and maintained thereat with continued agitation while 100 parts of aluminum chloride and then a solution of 64 parts of propionyl chloride in 111 parts of chlorobenzene is introduced during 30 and 45 minutes, respectively. The mixture thus obtained is let stand overnight and then poured onto a mixture of ice and hydrochloric acid. The chlorobenzene phase is separated and stripped of solvent by distillation at 85–95°. The residue, on cooling, solidifies. This solid product is 1,2,3,4,4a,9,10,10a - octahydro - 6 - methoxy 1,4a - dimethyl - 7 - propionyl - 1 - propionyloxymethylphenanthrene, which is further purified by trituration with water and dried in air.

B. *1,2,3,4,4a,9,10,10a - octahydro - 6 - methoxy - 1,4a-dimethyl - 7 - propionylphenanthrene - 1 - methanol.*—A mixture of 110 parts of 1,2,3,4,4a,9,10,10a-octahydro-6-methoxy-1,4a-dimethyl - 7 - propionyl - 1 propionyloxymethylphenanthrene, 400 parts of methanol, and 100 parts of potassium hydroxide dissolved in 100 parts of water is heated at the boiling point under reflux for 2 hours. Dilution of the reaction mixture with water affords a paste which is extracted with ether. The ether extract is washed successively with 10% hydrochloric acid, aqueous 10% sodium hydroxide, a solution of 42 parts of potassium hydroxide in 30 parts of water diluted with 120 parts of methanol, and water, the water wash being continued until the washings are neutral to litmus. Solvent is thereupon removed from the extract by vacuum distillation. The light yellow residue is 1,2,3,4,4a,9,10,10a-octahydro - 6 - methoxy - 1,4a - dimethyl - 7 - propionylphenanthrene-1-methanol.

C. *1,2,3,4,4a,9,10,10a - octahydro - 6 - methoxy - 1,4a-dimethyl-7-propionyloxyphenanthrene-1-methanol.*—To a cold solution of 16 parts of perbenoic acid in 575 parts of benzene is added a mixture of 5 parts of 1,2,3,4,4a,9,10,10a - octahydro- 6-methoxy-1,4a-dimethyl-7-propionyl-phenanthrene-1-methanol with 45 parts of benzene. The resultant mixture is let stand for 30 days at room temperatures, then consecutively washed with cold dilute aqueous sodium carbonate and water, the water wash being continued until the washings are neutral to litmus. Removal of solvent by vacuum distillation affords 1,2,3,4,4a,9,10,10a - octahydro - 6-methoxy-1,4a-dimethyl- 7-propionyloxyphenanthrene-1-methanol as the residue. The product has the formula

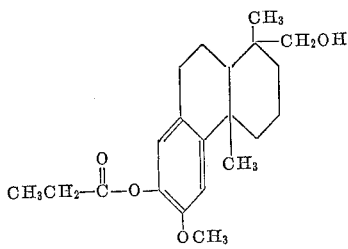

Example 2

*1,2,3,4,4a,9,10,10a - octahydro - 7 - hydroxy-6-methoxy-1,4a-dimethylphenanthrene-1-methanol.*—A mixture of 1 part of 1,2,3,4,4a,9,10,10a-octahydro-6-methoxy-1,4a-dimethyl-7-propionyloxyphenanthrene-1-methanol, 325 parts of 10% hydrochloric acid, and 180 parts of methanol is heated at the boiling point under reflux for 30 minutes, whereupon it is chilled and the insoluble solid separated therefrom by filtration. This solid is 1,2,3,4,4a,9,10,10a-octahydro - 7 - hydroxy-6-methoxy-1,4a-dimethylphenanthrene-1-methanol, which is further purified by washing on the filter with water and is then dried in air. The product has the formula

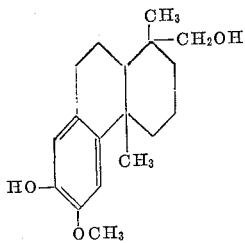

Example 3

A. *1-acetoxymethyl-7-acetyl-1,2,3,4,4a,9,10,10a-octahydro-6-methoxy-1,4a-dimethylphenanthrene.*—To a solution of 474 parts of 1-acetoxymethyl-1,2,3,4,4a,9,10,10a-octahydro-6-methoxy-1,4a-dimethylphenanthrene in 1665 parts of chlorobenzene at 10° under anhydrous conditions is added 410 parts of aluminum chloride during 30 minutes with vigorous agitation. A solution of 213 parts of acetyl chloride in 250 parts of chlorobenzene is then introduced during 1 hour, temperatures being maintained in the range 10–15° and agitation continued the while. The resultant mixture is maintained with agitation at 10° for 3 hours, then let stand at room temperatures overnight. It is thereupon poured onto a mixture of 3000 parts of ice and 290 parts of concentrated hydrochloric acid. The chlorobenzene phase is separated and washed to neutrality with water, at which point solvent is stripped by vacuum distillation. The solid residue is recrystallized from methanol, using decolorizing charcoal in process. The 1-acetoxymethyl-7-acetyl-1,2,3,4,4a,9,10,10a-octahydro-6-methoxy-1,4a-dimethylphenanthrene thus obtained melts at 100–102°.

B. *7 -ocetoxy-1-acetoxymethyl-1,2,3,4,4a,9,10,10a-octahydro - 6-methoxy-1,4a-dimethylphenanthrene.*—Substitution of 5 parts of 1-acetoxymethyl-7-acetyl-1,2,3,4,4a,9,10,10a - octahydro- 6-methoxy-1,4a-dimethylphenanthrene for the 1,2,3,4,4a,9,10,10a-octahydro-6-methoxy-1,4a-dimethyl-7-propionylphenanthrene-1-methanol called for in Example 1C affords, by the procedure there detailed, 7-acetoxy-1-acetoxymethyl-1,2,3,4,4a,9,10,10a-octahydro-6-methoxy-1,4a-dimethylphenanthrene. The product, further purified by recrystallization from aqueous methanol, melts at 136.5–139.5° and is characterized by a specific rotation of +62°. It has the formula

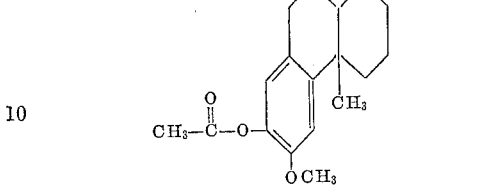

Example 4

*1,2,3,4,4a,9,10,10a-octahydro-6-methoxy-1,4a-dimethyl-7 - propionyloxy - 1 - propionyloxymethylphenanthrene.*—Substitution of 5 parts of 1,2,3,4,4a,9,10,10a-octahydro-6 - methoxy - 1,4a - dimethyl-7-propionyl-1-propionyloxymethylphenanthrene for the 1,2,3,4,4a,9,10,10a-octacydro-6 - methoxy - 1,4a - dimethyl - 7-propionylphenanthrene-1-methanol called for in Example 1C affords, by the procedure there detailed, 1,2,3,4,4a,9,10,10a-octahydro-6-methoxy-1,4a-dimethyl-7-propionyloxy - 1 - propionyloxymethylphenanthrene, of the formula

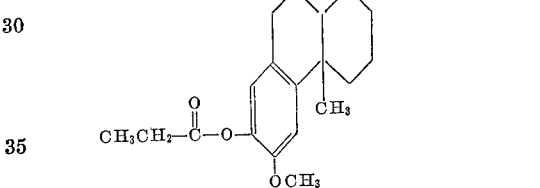

Example 5

*7 - acetoxy - 1,2,3,4,4a,9,10,10a - octahydro-6-methoxy-1,4a-dimethylphenanthrene-1-carboxylic acid.*—Substitution of 5 parts of 7-acetyl-1,2,3,4,4a,9,10,10a-octahydro-6-methoxy - 1,4a-dimethylphenanthrene-1-carboxylic acid for the 1,2,3,4,4a,9,10,10a-octahydro-6-methoxy-1,4a-dimethyl-7-propionylphenanthrene-1-methanol called for in Example 1C, affords, by the procedure there detailed, modified solely to the extent that cold dilute aqueous sodium sulfite is substituted as a wash for the cold dilute aqueous sodium carbonate prescribed, 7-acetoxy-1,2,3,4,4a,9,10,10a-octahydro - 6 - methoxy-1,4a-dimethylphenanthrene-1-carboxylic acid. The product has the formula

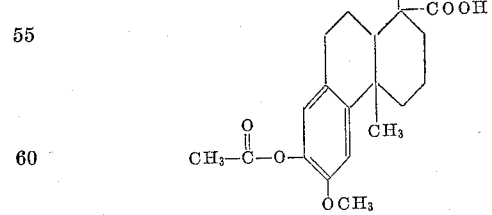

Example 6

*7-acetoxy-1,2,3,4,4a,9,10,10a-octahydro-6 - methoxy - 1-methoxycarbonyl - 1,4a-dimethylphenanthrene.*—Substitution of 5 parts of 7-acetyl-1,2,3,4,4a,9,10,10a-octahydro-6-methoxy-1-methoxycarbonyl-1,4a-dimethylphenanthrene for the 1,2,3,4,4a,9,10,10a-octahydro-6-methoxy-1,4a-dimethyl-7-propionylphenanthrene-1-methanol called for in Example 1C affords, by the procedure there detailed, 7 - acetoxy - 1,2,3,4,4a,9,10,10a - octahydro-6-methoxy-1-methoxycarbonyl-1,4a-dimethylphenanthrene, which, recrystallized from aqueous methanol, melts at 152–155.5° and has a specific rotation of +125°. The product has the formula

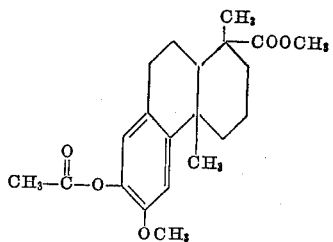

Example 7

*1,2,3,4,4a,9,10,10a - octahydro - 7 - hydroxy-6-methoxy-1-methoxycarbonylphenanthrene.*—Substitution of 1 part of 7-acetoxy-1,2,3,4,4a,9,10,10a-octahydro-6-methoxy-1-methoxycarbonyl-1,4a-dimethylphenanthrene for the 1,2,3,4,4a,9,10,10a - octahydro - 6-methoxy - 1,4a-dimethyl-7-propionyloxyphenanthrene-1-methanol called for in Example 2 affords, by the procedure there detailed, 1,2,3,4,4a,9,10,10a-octahydro-7-hydroxy-6-methoxy-1 - methoxycarbonylphenanthrene, which, successively recrystallized from aqueous methanol and hexane, is obtained as prisms melting at 132.5–135° and having a specific rotation of +137°. The product has the formula

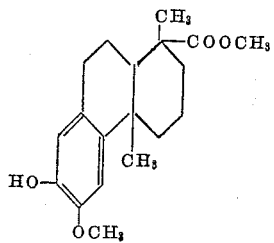

Example 8

*1,2,3,4,4a,9,10,10a-octahydro-6-methoxy-1-methoxycarbonyl-1,4a- dimethyl-7-propionyloxyphenanthrene.*—Substitution of 5 parts of 1,2,3,4,4a,9,10,10a-octahydro-6-methoxy-1-methoxycarbonyl-1,4a-dimethyl - 7 - propionylphenanthrene for the 1,2,3,4,4a,9,10,10a-octahydro-6-methoxy-1,4a-dimethyl-7-propionylphenanthrene-1-methanol called for in Example 1C affords, by the procedure there detailed, 1,2,3,4,4a,9,10,10a-octahydro-6-methoxy-1-methoxycarbonyl-1,4a-dimethyl-7-propionyloxyphenanthrene. The product has the formula

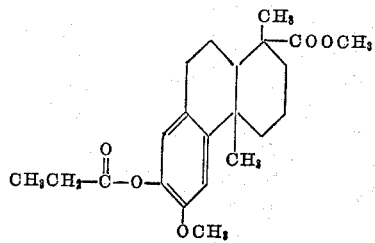

What is claimed is:
1. A compound of the formula

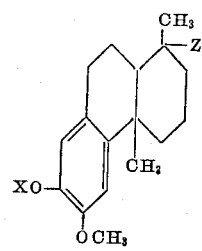

wherein X is selected from the group consisting of hydrogen and lower alkanoyl radicals; and Z is selected from the group consisting of carboxy, lower alkoxycarbonyl, hydroxymethyl, and lower alkanoyloxymethyl radicals.

2. A compound of the formula

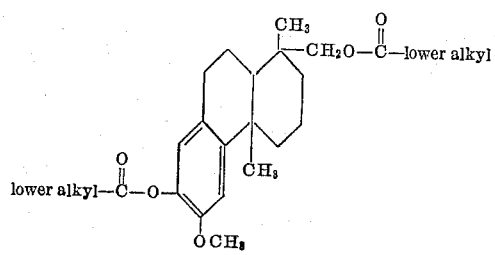

3. 7-acetoxy- 1 -acetoxymethyl-1,2,3,4,4a,9,10,10a-octahydro-6-methoxy-1,4a-dimethylphenanthrene.

4. A compound of the formula

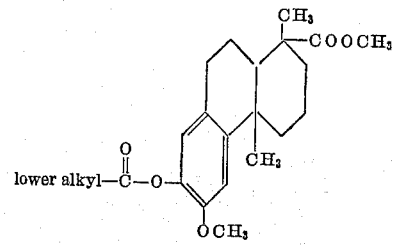

5. 7-acetoxy-1,2,3,4,4a,9,10,10a - octahydro-6-methoxy-1-methoxycarbonyl-1,4a-dimethylphenanthrene.

6. 1,2,3,4,4a,9,10,10a-octahydro - 7 - hydroxy-6-methoxy-1-methoxycarbonylphenanthrene.

No references cited.